US010377036B2

(12) United States Patent
Namoun et al.

(10) Patent No.: US 10,377,036 B2
(45) Date of Patent: Aug. 13, 2019

(54) MOTOR-DRIVEN ARTICULATED MODULE, ARTICULATION INCLUDING SEVERAL MODULES, AND EXOSKELETON INCLUDING SEVERAL ARTICULATIONS

(71) Applicant: ASSISTIVE ROBOTIC TECHNOLOGIES, Conflans Sainte Honorine (FR)

(72) Inventors: Fayçal Namoun, Courbevoie (FR); Ramzi Sellaouti, Clichy (FR); Laurent Pistiaux, Saint-Gratien (FR)

(73) Assignee: ASSISTIVE ROBOTIC TECHNOLOGIES, Conflans Sainte Honorine (FR)

( * ) Notice: Subject to any disclaimer, the term of this patent is extended or adjusted under 35 U.S.C. 154(b) by 699 days.

(21) Appl. No.: 15/039,782

(22) PCT Filed: Nov. 27, 2014

(86) PCT No.: PCT/EP2014/075841
§ 371 (c)(1),
(2) Date: Dec. 6, 2016

(87) PCT Pub. No.: WO2015/078981
PCT Pub. Date: Jun. 4, 2015

(65) Prior Publication Data

US 2017/0080559 A1 Mar. 23, 2017

(30) Foreign Application Priority Data

Nov. 27, 2013 (FR) ..................................... 13 61672

(51) Int. Cl.
*B25J 9/06* (2006.01)
*B25J 9/00* (2006.01)

(52) U.S. Cl.
CPC ............... *B25J 9/0006* (2013.01); *B25J 9/06* (2013.01)

(58) Field of Classification Search
CPC ................ A61H 3/00; A61H 2003/007; A61H 2003/0294; A61H 2003/043;
(Continued)

(56) References Cited

U.S. PATENT DOCUMENTS 3,580,099 A * 5/1971 Mosher .................. A61F 2/604 414/1
4,712,969 A * 12/1987 Kimura ..................... B25J 9/06 148/402
(Continued)

FOREIGN PATENT DOCUMENTS

JP 2010075548 A 4/2010

*Primary Examiner* — Alvin J Stewart
(74) *Attorney, Agent, or Firm* — Baker & Hostetler LLP

(57) ABSTRACT

A motorized articulated module comprises two elements that move with respect to one another, a linear actuator permitting motorization of the module and comprising a body and a stem able to move in translation with respect to the body along an axis, the body of the actuator connected to the elements by a connection having at least one degree of freedom in rotation, and two articulated rods associated with the actuator, connected to the stem of the actuator by a connection having one degree of freedom in rotation, the first articulated rod connected to the first element by a connection having at least one degree of freedom in rotation, the second articulated rod connected to the second element by a connection having at least one degree of freedom in rotation. An articulation comprising multiple modules and an exoskeleton comprising multiple articulations are provided.

11 Claims, 6 Drawing Sheets

(58) Field of Classification Search

CPC .. A61H 1/0277; A61H 1/0285; A61H 1/0292; A61H 1/0296; A61H 1/0274; A61H 2201/1215; A61H 2201/123; A61H 2201/1628; A61H 2201/1661; A61H 2201/1664; A61H 2201/2201; A61H 2201/1671; A61H 2201/1673; A61H 2201/1676; A61H 2201/1685; B25J 18/06; B25J 9/0006; B25J 9/0069; B25J 9/00075

See application file for complete search history.

(56) References Cited

U.S. PATENT DOCUMENTS

| | | | | |
|---|---|---|---|---|
| 4,848,179 | A * | 7/1989 | Ubhayakar | B25J 9/06 74/490.04 |
| 6,540,458 | B1 * | 4/2003 | Ponisch | B23Q 1/5462 409/201 |
| 8,544,853 | B2 * | 10/2013 | Kanaoka | B62D 57/032 180/8.1 |
| 8,986,232 | B2 * | 3/2015 | Saglia | A61H 1/0266 482/79 |
| 9,919,434 | B1 * | 3/2018 | Rey | B25J 9/0075 |
| 10,080,697 | B2 * | 9/2018 | Swift | B25J 9/0075 |
| 2004/0126198 | A1 * | 7/2004 | Chen | B23Q 1/5462 409/201 |
| 2009/0314119 | A1 * | 12/2009 | Knoll | A61B 1/00156 74/490.01 |
| 2010/0331150 | A1 * | 12/2010 | Patoglu | A63B 21/0004 482/79 |
| 2011/0313331 | A1 * | 12/2011 | Dehez | A61H 1/0277 601/33 |
| 2012/0068422 | A1 * | 3/2012 | Kanaoka | B25J 9/0006 280/1.181 |
| 2012/0330198 | A1 * | 12/2012 | Patoglu | B25J 9/0006 601/33 |
| 2016/0016309 | A1 * | 1/2016 | Swift | B25J 9/0075 623/24 |
| 2016/0031080 | A1 * | 2/2016 | Rey | B25J 9/0075 74/490.05 |
| 2016/0113831 | A1 * | 4/2016 | Hollander | A61H 1/0244 623/31 |
| 2016/0114479 | A1 * | 4/2016 | Rosheim | B25J 9/0075 74/490.03 |
| 2016/0151910 | A1 * | 6/2016 | Sanatkar | B25J 9/06 74/490.03 |
| 2017/0239820 | A1 * | 8/2017 | Ohta | B25J 17/0275 |

* cited by examiner

MOTOR-DRIVEN ARTICULATED MODULE, ARTICULATION INCLUDING SEVERAL MODULES, AND EXOSKELETON INCLUDING SEVERAL ARTICULATIONS

CROSS-REFERENCE TO RELATED APPLICATIONS

This application is a National Stage of International patent application PCT/EP2014/075841, filed on Nov. 27, 2014, which claims priority to foreign French patent application No. FR 1361672, filed on Nov. 27, 2013, the disclosures of which are incorporated by reference in their entirety.

FIELD OF THE INVENTION

The invention relates to a motorized articulated module, to a system comprising multiple modules, and to an exoskeleton comprising multiple articulations.

BACKGROUND

Such modules are used in a robot of the elephant trunk or snake type. This type of robot is for example used to reproduce the movement of a vertebral column.

The human vertebral column is that part of the human body having the greatest number of articulations. Each of these articulations has five to six degrees of freedom. Numerous attempts have been made, in humanoid robots, to come as close as possible to human functionality.

Conventional attempts have focused on reproducing, in robots, multiple vertebrae of human a vertebral column by arranging motorized articulations between each vertebra. In order to come close to a human vertebral column, it is necessary to provide a large number of articulated vertebrae.

Conventionally, the vertebrae of robots are formed by plates, and actuators perpendicular to the plates serve as articulations between the vertebrae. The amplitude of movement of the actuators contributes to the mobility of the vertebral column. This amplitude is limited by the distance between two adjacent plates. In a given space, increasing the number of vertebrae can only be made by sacrificing the amplitude of relative movement between the vertebrae.

SUMMARY OF THE INVENTION

The invention aims to improve the mobility between the vertebrae. In other words, for a given distance between two vertebrae, the invention aims to increase the amplitude of the relative movements of two adjacent vertebrae.

To that end, the invention relates to a motorized articulated module comprising two elements that are able to move with respect to one another, characterized in that it further comprises:

a first linear actuator permitting motorization of the module and comprising a body and a stem that is able to move in translation with respect to the body along an axis, the body of the first actuator being connected to each of the two elements by means of a connection having at least one degree of freedom in rotation, two articulated rods associated with the first actuator, each connected, at a first one of their ends, to the stem of the first actuator by means of a connection having one degree of freedom in rotation, a second end of a first one of the two articulated rods being connected to the first of the two elements by means of a connection having at least one degree of freedom in rotation, a second end of a second one of the two articulated rods being connected to the second of the two elements by means of a connection having at least one degree of freedom in rotation.

The motorized articulated module according to the invention can be implemented in any type of robot. One of the envisaged applications is of course a vertebral column in which the two mobile elements of the invention form two adjacent vertebrae, the modules being assembled in series. The vertebral column is to be understood in the wider sense. Modules can also be connected in series so as to create a fish-type robot which can move in water.

Another application of the series-connected modules may be envisaged in an exoskeleton, in particular for the articulation of limbs, such as the hip or the knee of the exoskeleton.

In order to create a robot in which modules according to the invention are placed in series, the invention also relates to an articulation comprising multiple articulated modules according to the invention, characterized in that two adjacent modules share a mobile element.

BRIEF DESCRIPTION OF THE DRAWINGS

The invention will be better understood and further advantages will become apparent upon reading the detailed description of one embodiment given by way of example, which description is illustrated by the attached drawing in which.

DETAILED DESCRIPTION

For the sake of clarity, the same elements will bear the same references in the various figures.

The invention makes it possible to motorize the articulation of two rigid elements which in the following will be referred to as vertebrae. The two vertebrae are able to move with respect to one another according to one or two degrees of freedom in rotation. Each of the rotations is motorized. The term vertebra is used in relation to a human vertebra. In robotics, the mobility of two vertebrae is conventionally modeled by a connection with two small-amplitude rotations, of the order of several degrees. The invention is already of interest for two vertebrae having just one degree of freedom in rotation. The invention may also be implemented for two vertebrae that are able to move with respect to one another according to two degrees of freedom in rotation, wherein the axes of the two rotations intersect. The axes of the two rotations may be perpendicular. It is also possible to orient the two axes of rotation so as to form, between the axes, an angle of less than 90°, for example approximately 60°. This makes it possible to promote certain movements of the vertebrae with respect to one another.

Figure 1:
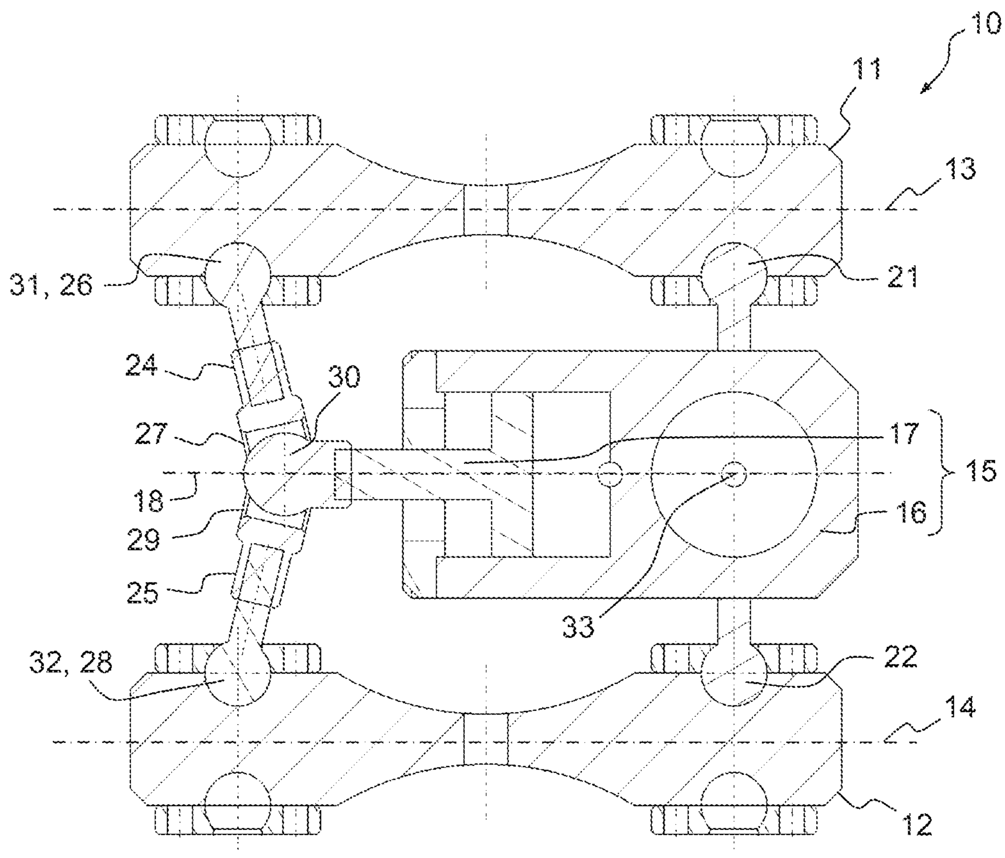
FIG. 1 shows, in cross section, a motorized articulated module according to the invention.

FIG. 1 shows, in section, an articulated module 10 which is motorized and comprises two vertebrae 11 and 12, each formed by a rigid mechanical part that is assumed to be non-deformable with respect to the movements of the articulation. The vertebra 11 extends principally along a plane 13 and the vertebra 12 extends principally along a plane 14. The two planes 12 and 14 are perpendicular to the plane of FIG. 1.

The module 10 shown in FIG. 1 has two degrees of freedom in rotation. A first degree of freedom is articulated about an axis perpendicular to the plane of FIG. 1. This first degree of freedom is motorized by means of a linear actuator 15 comprising a body 16 and a stem 17. The stem 17 is able to move in translation with respect to the body 16 along an axis 18 contained in the plane of FIG. 1. The actuator 15 may be motorized by any form of energy. It may be a hydraulic, pneumatic or electric actuator. The body 16 of the actuator 15 is connected to the vertebra 11 by means of a connection having two degrees of freedom in rotation 21, and to the vertebra 12 by means of a connection having at least two degrees of freedom in rotation 22. The two connections 21 and 22 are for example ball swivel connections. A third degree of freedom in rotation, present in the ball swivel connection, is of no functional use but makes it possible to reduce the hyperstaticity of the overall connection between the two vertebrae 11 and 12. In addition, a ball swivel connection is simpler to create than a connection having two degrees of freedom in rotation.

In the case of a module in which the vertebrae are mobile with respect to one another with just one degree of freedom in rotation, the connections connecting the body 16 to each of the two vertebrae 11 and 12 may have just one degree of freedom in rotation. These are then pivot connections of which the respective axes are both perpendicular to the plane of FIG. 1 and therefore parallel to the axis of rotation of the two vertebrae with respect to one another.

The module 10 shown in FIG. 1 comprises two articulated rods 24 and 25 associated with the actuator 15. The articulated rods 24 and 25 each extend longitudinally between two ends, 26 and 27 for articulated rod 24, and 28 and 29 for articulated rod 25. The articulated rods 24 and 25 are advantageously of the same length between their ends.

The articulated rods 24 and 25 are connected by their ends 27 and 29 to the stem 17 of the actuator 15, each by means of a connection having one degree of freedom in rotation. Advantageously, the two articulated rods 24 and 25 are articulated with respect to the stem 17 of the actuator by means of the same pivot connection, making this connection easier to create. This is a pivot connection 30 of which the axis is perpendicular to the plane of FIG. 1 and therefore parallel to the axis of rotation of the connection motorized by the actuator 15. Alternatively, it is possible to implement two distinct pivot connections, each between the stem 17 and one of the articulated rods 24 and 25. The two pivot connections then both have axes of rotation that are parallel to the axis of rotation of the connection motorized by the actuator 15.

The articulated rod 24 is connected, at its end 26, to the vertebra 11 by means of a connection having at least two degrees of freedom in rotation 31. Equally, the articulated rod 25 is connected, at its end 28, to the vertebra 12 by means of a connection having at least two degrees of freedom in rotation 32. As before, the two connections 31 and 32 may be ball swivel connections.

As before, in the case of a module in which the vertebrae are mobile with respect to one another with just one degree of freedom in rotation, the connections connecting the articulated rods 24 and 25 to each of the two vertebrae 11 and 12 may have just one degree of freedom in rotation. These are then pivot connections of which the respective axes are both perpendicular to the plane of FIG. 1 and therefore parallel to the axis of rotation of the two vertebrae with respect to one another. Nonetheless, even in this case, the connections between the articulated rods and the vertebrae may be of the Cardan type, that is to say with two degrees of freedom so as to avoid a degree of hyperstaticity in the module, which would appear in the necessary parallel arrangement of the axes of the pivot connections connecting the body of the actuator to the vertebrae and the axes of the pivot connections connecting the articulated rods to the vertebrae.

When the actuator 15 is actuated, the stem 17 moves in translation with respect to the body 16. The two ends 27 and 29 of the two articulated rods 24 and 25 move along the axis 18 and the distance between the vertebrae 11 and 12, measured at the connections 31 and 32 with the articulated rods 24 and 25, changes. During this movement of the actuator 15, its body 16 pivots with respect to each of the vertebrae 11 and 12 at each of the connections 21 and 22.

During the movement of the actuator 15, the two vertebrae 11 and 12 pivot with respect to one another about an axis 33 located at the midpoint between the connections 21 and 22.

Figure 2:
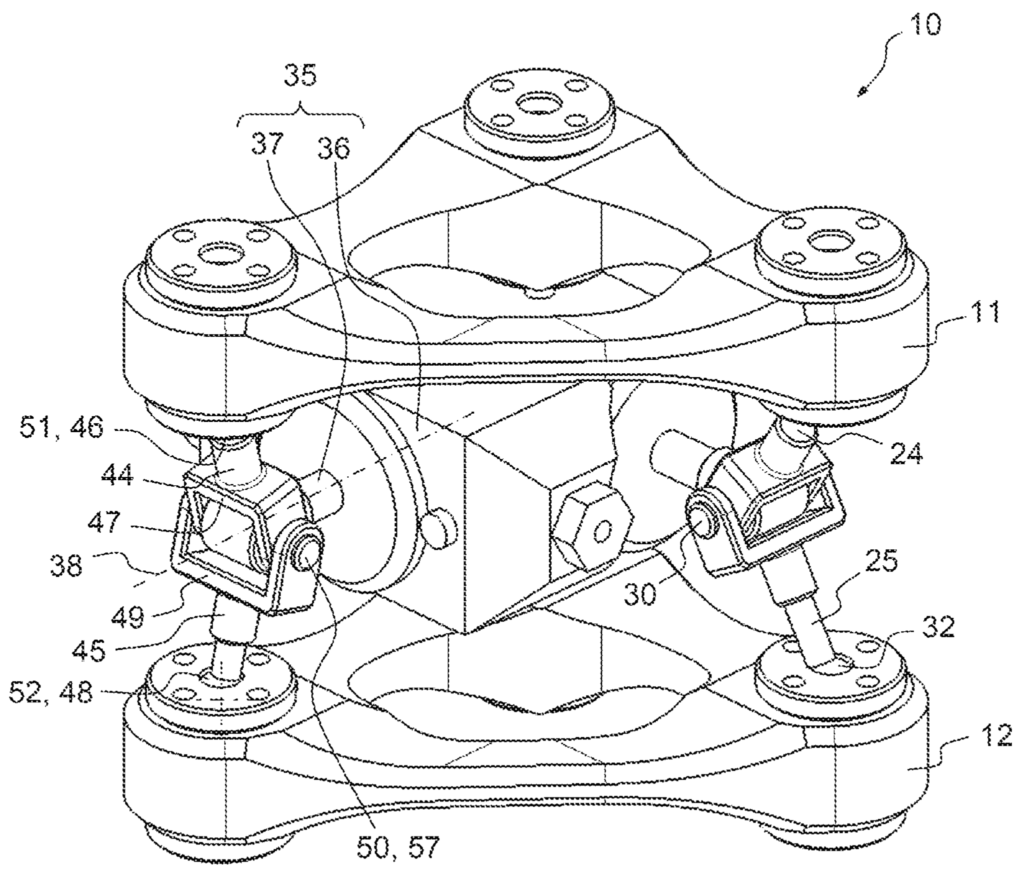
FIG. 2 shows, in perspective, the module according to the invention.
Figure 3:
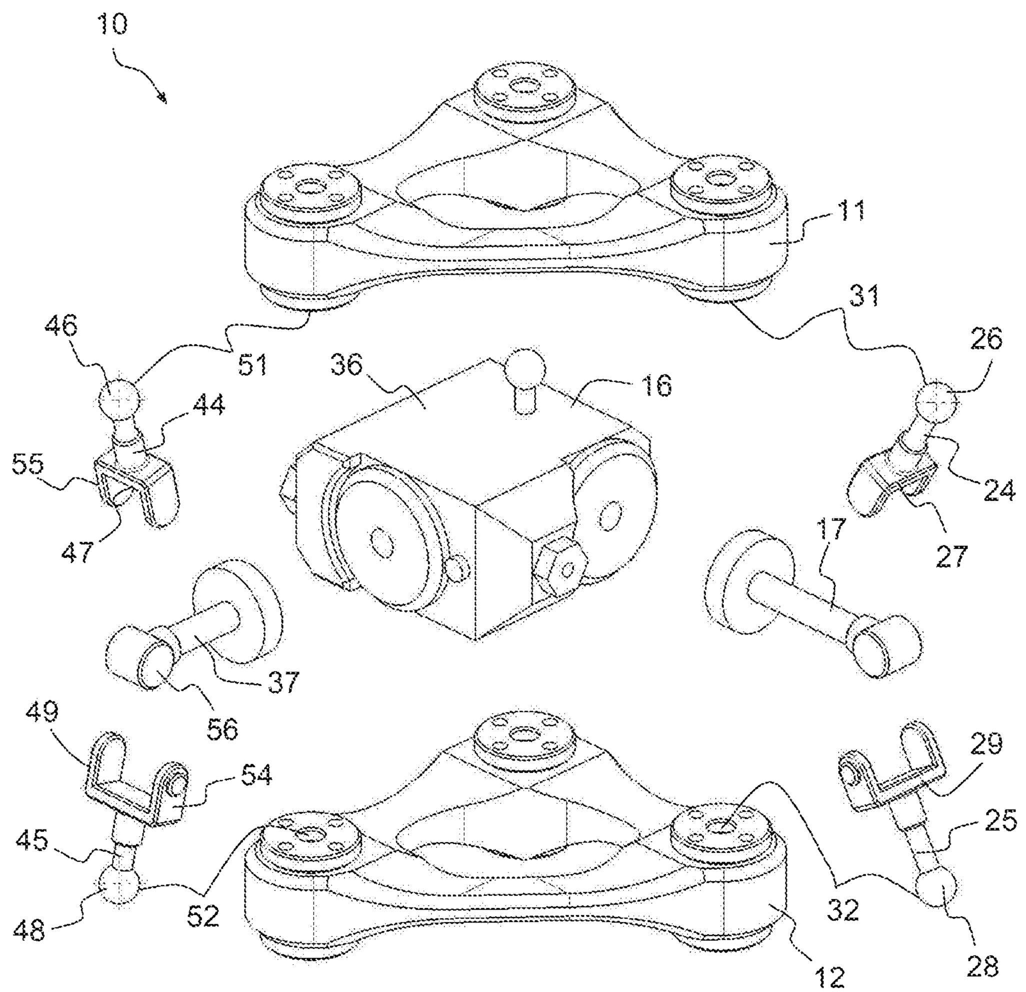
FIG. 3 shows, in exploded view, the module according to the invention.

FIG. 2 shows, in perspective, the module 10 of FIG. 1, and FIG. 3 shows this same module in an exploded perspective view. These two figures make it possible to show the presence of two actuators having distinct axes of translation. The two vertebrae 11 and 12, the actuator 15 and the two articulated rods 24 and 25 associated therewith are still present. The module 10 also comprises a second linear actuator 35 comprising a body 36 and a stem 37 that is able to move in translation with respect to the body 36 along an axis 38 which is distinct from the axis 18. The body 36 is secured to the body 16. The two bodies 16 and 36 may belong to a single mechanical part. The bodies 16 and 36 are connected to each of the two vertebrae 11 and 12 by means of a connection having two degrees of freedom in rotation, respectively the connection 21 for the vertebra 11 and the connection 22 for the vertebra 12.

The module 10 also comprises two articulated rods 44 and 45 associated with the actuator 35. As for the articulated rods 24 and 25 the articulated rods 44 and 45 each extend longitudinally between two ends, 46 and 47 for articulated rod 44, and two ends 48 and 49 for articulated rod 45. The articulated rods 44 and 45 are advantageously of the same length between their ends. The module 10 may comprise different pairs of articulated rods, the first pair consisting of the articulated rods 24 and 25 and the second pair consisting of the articulated rods 44 and 45. This difference makes it possible to differently modulate the amplitude of the rotations motorized by each of the actuators 15 and 35. Alternatively, the four articulated rods 24, 25, 44 and 45 may be of the same length. In addition to the symmetry of the two rotations, this alternative makes it possible to simplify manufacture of the module 10 by reducing the number of different components.

The articulated rods 44 and 45 are connected by their ends 47 and 49 to the stem 37 of the actuator 35 by means of a connection having one degree of freedom in rotation. Advantageously, the two articulated rods 44 and 45 are articulated with respect to the stem 37 of the actuator 35 by means of the same pivot connection, making this connection easier to create. This is a pivot connection 50 of which the axis is parallel to the axis of rotation of the connection motorized by the actuator 35.

In order to create a single connection 50 to connect three mechanical parts, in this case the two articulated rods 44 and 45 and the stem 37, the two articulated rods 44 and 45 may each comprise a yoke, respectively 54 and 55. The stem 37 comprises a knuckle pivot 56. The pivot connection assembly 50 is shown in FIG. 2. The yokes 54 and 55 are nested and the knuckle pivot 56 is arranged between the yokes 54 and 55. In this arrangement, a spindle 57 passes through the three mechanical parts at the level of the yokes 54 and 55 and the knuckle pivot 56. The pivot connection 50 is created by leaving a functional clearance between the knuckle pivot and at least two of the mechanical parts through which it passes. The presence of the yokes makes it possible to transmit forces into the stem 37 along its axis 38 and into each of the articulated rods 44 and 45 along their respective principal direction. Alternatively, it is possible to simplify the design by dispensing with the yokes and arranging the ends 47 and 49 and the knuckle pivot 56 side-by-side, with the spindle 57 still passing through these three elements. This simplification of the pivot connection 50 carries a penalty in terms of the symmetry of forces in the module 10. The pivot connection 30 may be created in a manner identical to the pivot connection 50.

As for the connections between the stem 17 and the two articulated rods 24 and 25, it is possible to implement two distinct pivot connections, each between the stem 37 and one of the articulated rods 44 and 45. The two pivot connections then both have axes of rotation that are parallel to the axis of rotation of the connection motorized by the actuator 35.

The articulated rod 44 is connected, at its end 46, to the vertebra 11 by means of a connection having two degrees of freedom in rotation 51. Equally, the articulated rod 45 is connected, at its end 48, to the vertebra 12 by means of a connection having two degrees of freedom in rotation 52. As before, the two connections 51 and 52 may be ball swivel connections.

As for the actuator 15, when the actuator 35 is actuated, the distance between the vertebrae 11 and 12, measured at the connections 51 and 52, changes. The two rotations of the vertebrae with respect to one another are completely independent, with each actuator 15 and 35 being able to motorize one of the rotations.

Figure 4:
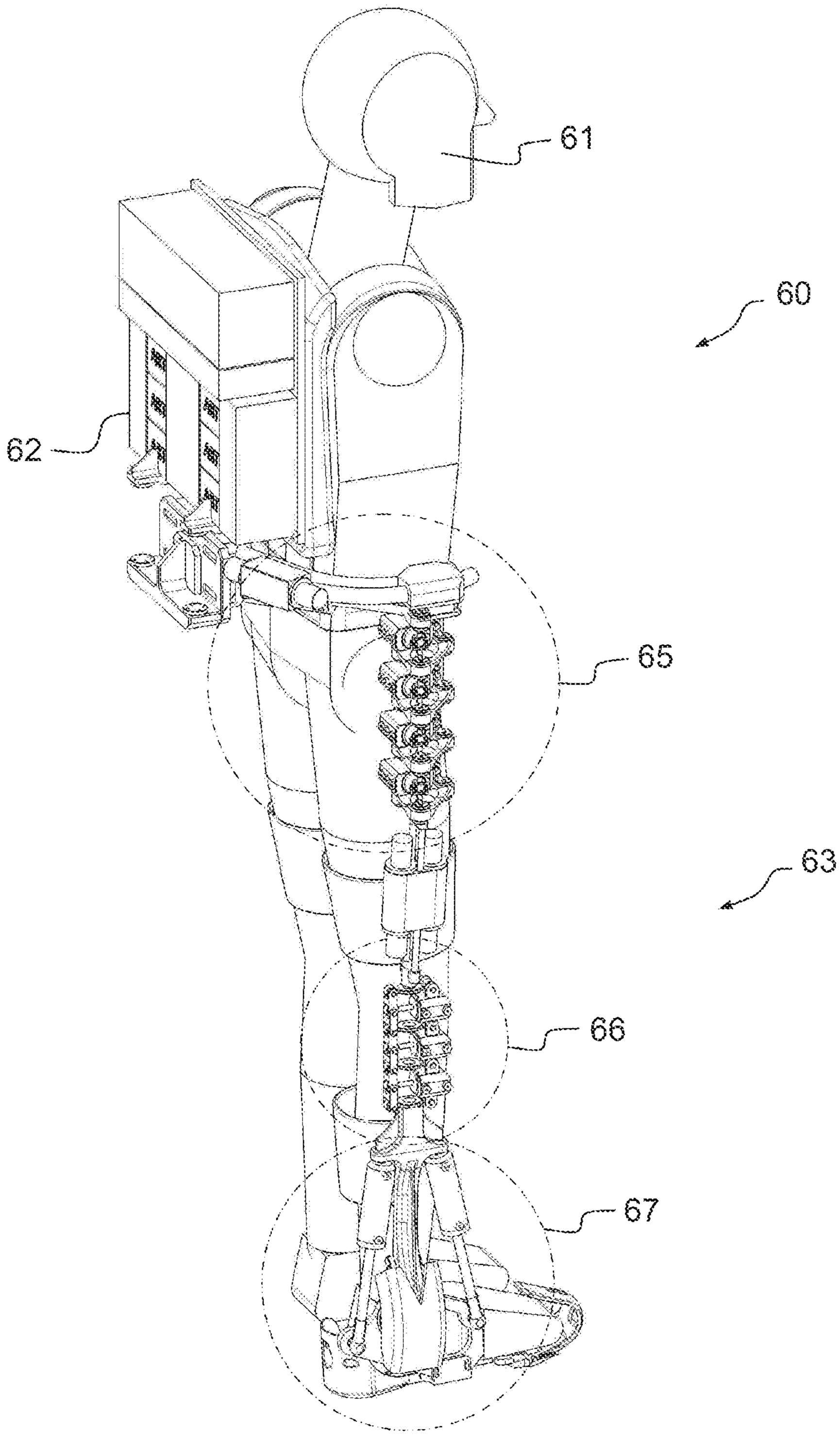
FIG. 4 shows an exoskeleton using multiple modules according to the invention.

FIG. 4 shows an exoskeleton 60 using multiple modules according to the invention. The exoskeleton 60 makes it possible, for example, for a person 61 with a lower limb handicap to walk. The exoskeleton 60 makes it possible to accompany the movement of the hips, the knees and the ankles of the person 61. To that end, the exoskeleton 60 comprises an upper portion 62 that is strapped to the torso of the person 61 and a lower portion 63 that has multiple motorized articulations designed to compensate for the motive deficiencies of the handicapped person 61. The motorized articulations are arranged in lateral proximity to the lower limbs of the person 61.

The exoskeleton 60 comprises from top to bottom, that is to say with increasing distance from the upper portion 62 toward the feet of the person 61, two articulations 65 that each accompany the movements of one hip of the person 61, two articulations 66 that each accompany the movements of one knee of the person 61, and two articulations 67 that each company the movements of one ankle of the person 61. For the sake of convenience, the articulation 65 will henceforth be referred to as the hip of the exoskeleton 60 and the articulation 66 will be the knee of the exoskeleton 60.

The exoskeleton 60 is attached to each of the feet of the person 61 below each of the articulations 67. It is entirely possible to fit the device to a person 61 who has had all or part of their lower limbs amputated.

Each of the hips 65 comprises a system consisting of four modules and each of the knees 66 comprises a system consisting of three modules. In each system, two adjacent modules share a vertebra. The detail of each system will be described with the aid of the following figures. It goes without saying that the number of modules in each system is given purely by way of example. The number of modules is in principle defined by the maximum angular range which one wishes to achieve overall for the articulation in question, on the basis of the range of each module.

Figure 5:
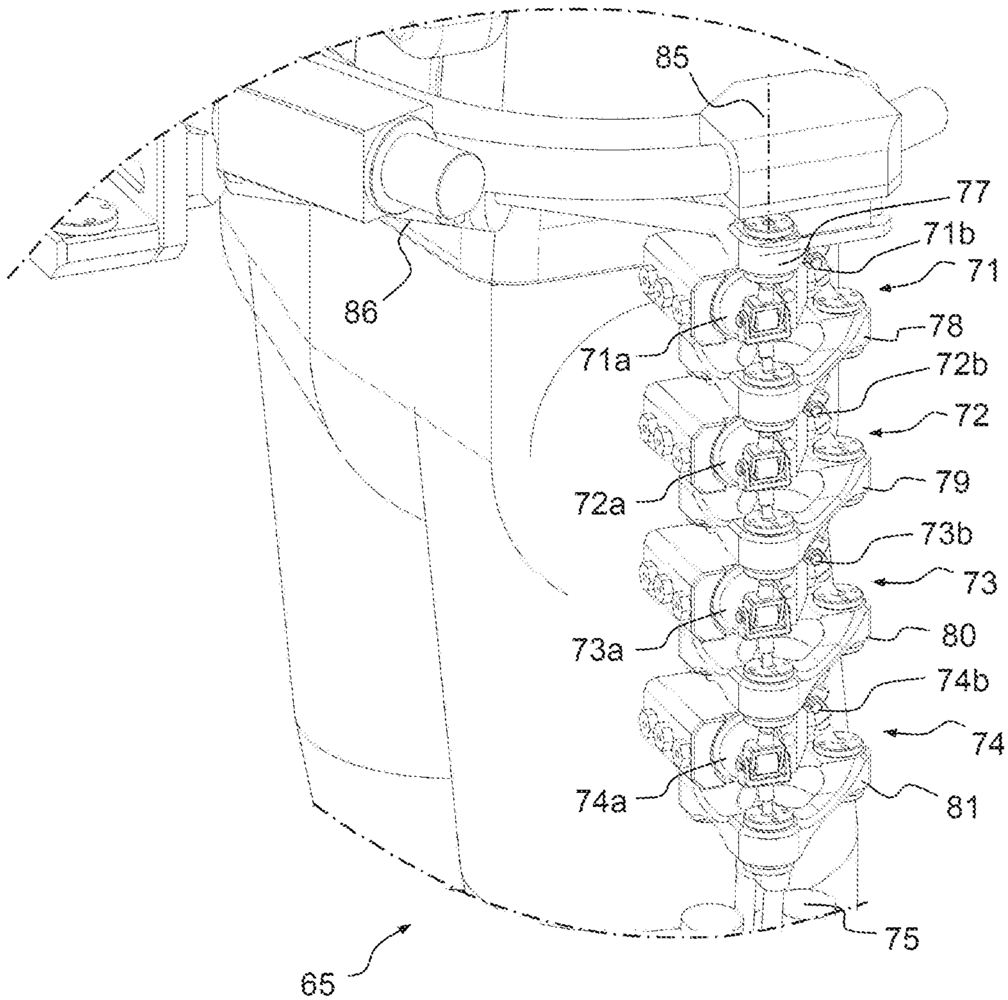
FIG. 5 shows an articulation of the hip of the exoskeleton.

FIG. 5 shows, in greater detail, an articulation 65 forming the hip of the exoskeleton 60. The articulation 65 comprises four modules 71, 72, 73 and 74 which are all similar to the module 10 described above. The four modules are connected in series between the upper portion 62 and an intermediate part 75 of the exoskeleton 60, arranged below the hip 65 and above the knee 66. The module 71 has an upper vertebra 77 secured to the upper portion 62 and a lower vertebra 78 forming the upper vertebra of the module 72. The module 72 has a lower vertebra 79 forming the upper vertebra of the module 73. The module 73 has a lower vertebra 80 forming the upper vertebra of the module 74 which has a lower vertebra 81 secured to the intermediate part 75 that is designed to be positioned along one of the thighs of the person 61. It is possible to provide one or more straps by means of which the intermediate part 75 can be attached to the thigh in question.

Each of these modules 71, 72, 73 and 74 has two actuators identified by the reference number of the module in question followed by a letter a or b. In a particular position of the exoskeleton 60, for example when the person 61 is standing still, their legs being vertical, the axes of the actuators **71*a* to 74*a* are all parallel and the axes of the actuators 71*b* to 74*b* are also all parallel. This position can be obtained when the planes containing the various vertebrae are all parallel. By way of illustration, this parallel arrangement can be obtained when the planes 13 and 14 shown in FIG. 1 are parallel and this is the case for all the modules of a given articulation. The movements of the actuators 71*a* to 74*a* all contribute to a same overall rotation of the hip 65, in the example shown a rotation in a frontal plane of the exoskeleton 60. Equally, the movements of the actuators 71*b* to 74*b* all contribute to a same overall rotation of the hip 65, a rotation in a sagittal plane of the exoskeleton 60. Even if each of the modules 71 to 74** has just a moderate range, placing multiple modules in series in a configuration where the axes of the actuators of the various modules are parallel in groups makes it possible to maintain rotation without torsion of the articulation.

Alternatively, it is possible to arrange the actuators such that this parallel arrangement is not obtained, in order to produce torsion of the articulation 65.

Advantageously, the articulation 65 also comprises common control means for the first actuators **71*a* to 74*a* and for the second actuators 71*b* to 74*b* of the various modules 71 to 74**.

It is possible to provide the hip with a third rotation in a horizontal plane of the exoskeleton 60. To that end, the upper vertebra 77 of the module 71 may be connected to the upper portion 62 by a pivot connection having a vertical axis 85. An actuator 86 can motorize this pivot connection.

Figure 6:
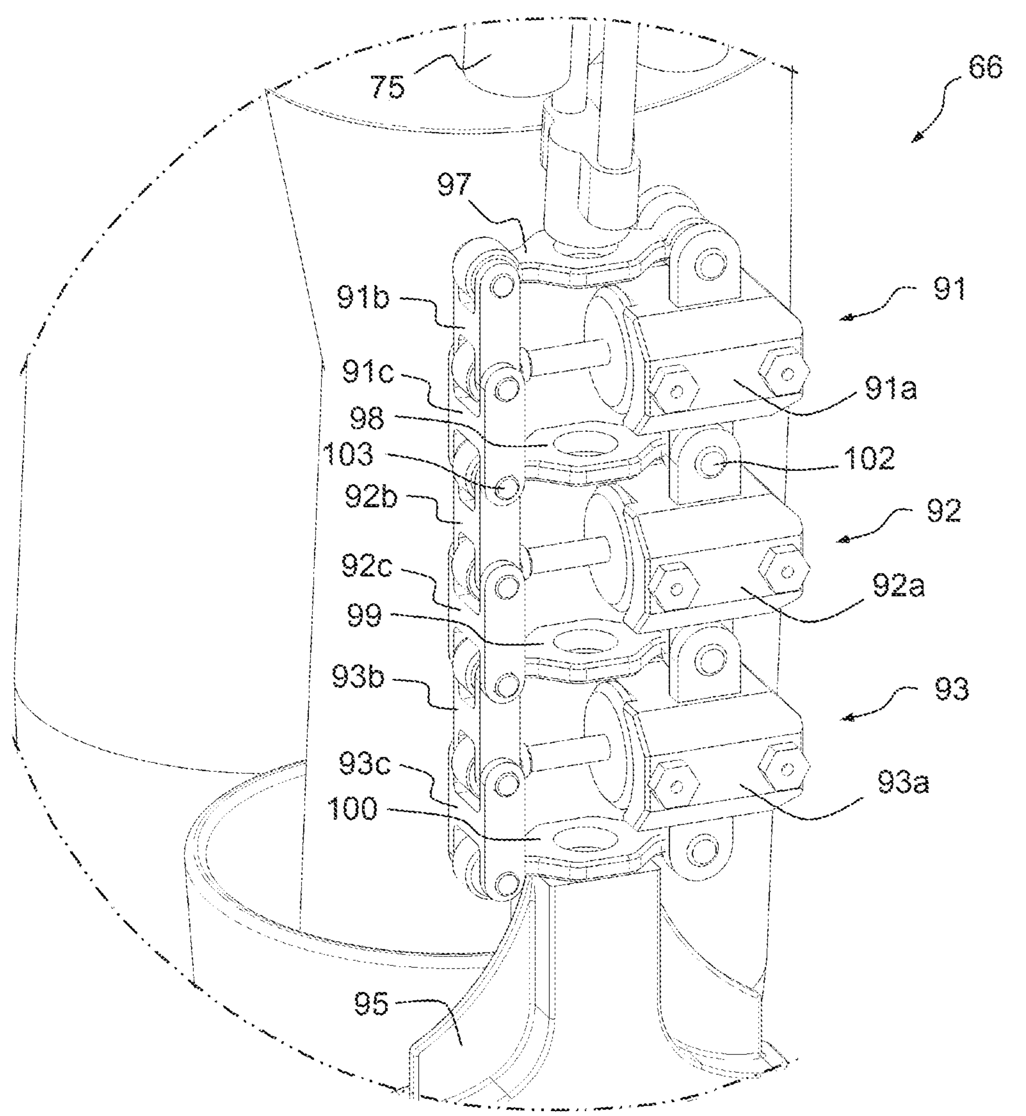
FIG. 6 shows an articulation of the knee of the exoskeleton.

FIG. 6 shows, in greater detail, the knee 66 of the exoskeleton 60. The knee 66 comprises three similar modules 91, 92 and 93. The three modules 91, 92 and 93 each comprise just a single actuator and therefore only two articulated rods per module, the two articulated rods being associated with the actuator of the module in question.

The three modules 91, 92 and 93 are connected in series between the intermediate part 75 and another intermediate part 95 of the exoskeleton 60, arranged below the knee 66 and above the ankle 67. The intermediate part 95 is designed to be positioned along one of the calves of the person 61. It is possible to provide one or more straps by means of which the intermediate part 75 can be attached to the calf in question.

The module 91 has an upper vertebra 97 secured to the intermediate part 75 and a lower vertebra 98 forming the upper vertebra of the module 92. The module 92 has a lower vertebra 99 forming the upper vertebra of the module 93 that has a lower vertebra 100 secured to the intermediate part 95.

Each of the modules 91, 92 and 93 has one actuator, respectively 91*a*, 92*a* and 93*a*. As for the hip 65, in a particular position of the knee 66, the axes of the actuators 91*a*, 92*a* and 93*a* are all parallel. The movements of the actuators 91*a*, 92*a* and 93*a* all contribute to a same overall rotation of the knee 66, in the example shown a rotation in a sagittal plane of the exoskeleton 60. Even if each of the modules 91, 92 and 93 has just a moderate range, placing multiple modules in series in a configuration where the axes of the actuators of the various modules are parallel makes it possible to maintain rotation without torsion of the articulation.

Alternatively, it is possible to arrange the actuators such that this parallel arrangement is not obtained, in order to produce torsion of the articulation 66.

The body of each actuator 91*a*, 92*a* and 93*a* is connected to an upper vertebra by a pivot connection and to a lower vertebra by another pivot connection. Advantageously, a common pivot connection connects a common vertebra to two adjacent modules and the bodies of the actuators of the two adjacent modules. For example, a pivot connection 102 connects the vertebra 98, the body of the actuator 91*a* and the body of the actuator 92*a*. The design of the common pivot connection 102 can be similar to the design of the connections 30 and 50.

As for the module 10, each of the modules 91, 92 and 93 has two articulated rods associated with each actuator 91*a*, 92*a* and 93*a*. In FIG. 6, the articulated rods are identified by the reference of the module followed by either the letter b or c for each of the two articulated rods.

Advantageously, a common pivot connection connects a common vertebra to two adjacent modules and the corresponding articulated rods. For example, a common pivot connection 103 connects the vertebra 98 and the articulated rods 91*c* and 92*b*.

Advantageously, the articulation 66 also comprises common control means for the first actuators 91*a* to 93*a* of the various modules 91 to 93.

These common pivot connections make it possible to simplify the articulation 66 and to reduce its size, in particular its height, defined when the exoskeleton 60 is upright.

The invention claimed is:

1. A motorized articulated module comprising two elements that are able to move with respect to one another, further comprising:

a first linear actuator permitting motorization of the module and comprising a body and a stem that is able to move in translation with respect to the body along an axis, the body of the first actuator being connected to each of the two elements by means of a connection having at least one degree of freedom in rotation, two articulated rods associated with the first actuator, each connected, at a first one of their ends, to the stem of the first actuator by means of a connection having one degree of freedom in rotation, a second end of a first one of the two articulated rods being connected to the first of the two elements by means of a connection having at least one degree of freedom in rotation, a second end of a second one of the two articulated rods being connected to the second of the two elements by means of a connection having at least one degree of freedom in rotation.

2. The articulated module as claimed in claim 1, further comprising:

a second linear actuator permitting motorization of the module and comprising a body and a stem that is able to move in translation with respect to the body along an axis, the axis of the second actuator being distinct from the axis of the first actuator, the body of the second actuator being secured to the body of the first actuator, the bodies of the two actuators being connected to each of the two elements by means of a connection having at least two degrees of freedom in rotation, two articulated rods associated with the second actuator, each connected, at a first one of their ends, to the stem of the second actuator by means of a connection having one degree of freedom in rotation, a second end of a first one of the two articulated rods being connected to the first of the two elements by means of a connection having two degrees of freedom in rotation, a second end of a second one of the two articulated rods being connected to the second of the two elements by means of a connection having two degrees of freedom in rotation, wherein the second end of the first articulated rod associated with the first actuator is connected to the first one of the two elements by means of a connection having at least two degrees of freedom in rotation, and wherein the second end of the second articulated rod associated with the first actuator is connected to the second one of the two elements by means of a connection having at least two degrees of freedom in rotation.

3. An articulation comprising multiple modules articulated as claimed in claim 2, wherein a mobile element is shared by two adjacent modules, and wherein, in a particular position of the articulation, the axes of the first actuators of each one of the modules are parallel, in a particular position of the articulation, the axes of the second actuators of each one of the modules are parallel.

4. An articulation comprising multiple modules articulated as claimed in claim 2, wherein a mobile element is shared by two adjacent modules, and wherein, in a particular position of the articulation, the axes of the first actuators of each one of the modules are parallel, further comprising common control means for the second actuators of the various modules.

5. An exoskeleton, comprising two articulations, comprising multiple modules articulated as claimed in claim 2, wherein a mobile element is shared by two adjacent modules and wherein, in a particular position of the articulation, the axes of the first actuators of each one of the modules are parallel, which are each designed to accompany the movements of one hip of a person and two said articulations which are each designed to accompany the movements of one knee of the person.

6. The articulated module as claimed in claim 1, wherein the articulated rods are articulated with respect to the stem of their respective actuator by means of one and the same pivot connection.

7. An articulation comprising multiple modules articulated as claimed in claim 1, wherein a mobile element is shared by two adjacent modules.

8. The articulation as claimed in claim 7, wherein, in a particular position of the articulation, the axes of the first actuators of each one of the modules are parallel.

9. The articulation as claimed in claim 8, wherein the modules each have just a single actuator, in that, for each module, the body of the actuator is connected to each one of the two elements by means of a pivot connection, and wherein a single common pivot connection connects a common mobile element to two adjacent modules and the bodies of the actuators of the two adjacent modules.

10. The articulation as claimed in claim 8, wherein the modules each have just a single actuator, wherein, in each module, the articulated rods are connected to the corresponding elements by means of a pivot connection, and in that a single common pivot connection connects a common mobile element to two adjacent modules and the corresponding articulated rods.

11. The articulation as claimed in claim 7, further comprising common control means for the first actuators of the various modules.

* * * * *